United States Patent
Orfanos et al.

(10) Patent No.: US 8,406,331 B2
(45) Date of Patent: Mar. 26, 2013

(54) METHOD FOR SIGNALING THE STATUS OF A SUBCARRIER IN A MC NETWORK AND A METHOD FOR ADAPTIVELY ALLOCATING THE SUBCARRIERS IN A MC NETWORK

(75) Inventors: Georgios Orfanos, Aachen (DE); Joerg Habetha, Aachen (DE); Begonya Otal, Aachen (DE); Klaus Peter May, Aachen (DE); Francesc Dalmases, Bellaterra-Barcelona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 728 days.

(21) Appl. No.: 11/570,549

(22) PCT Filed: Jun. 15, 2005

(86) PCT No.: PCT/IB2005/051970
§ 371 (c)(1),
(2), (4) Date: Dec. 13, 2006

(87) PCT Pub. No.: WO2006/000955
PCT Pub. Date: Jan. 5, 2006

(65) Prior Publication Data
US 2008/0273606 A1 Nov. 6, 2008

(30) Foreign Application Priority Data
Jun. 24, 2004 (EP) .................................... 04102937

(51) Int. Cl.
*H04K 1/10* (2006.01)
*H04L 27/28* (2006.01)
(52) U.S. Cl. ....................................... 375/265; 375/259

(58) Field of Classification Search .................. 370/276; 375/219; 455/73; 710/1
See application file for complete search history.

(56) References Cited

U.S. PATENT DOCUMENTS

| 5,828,663 | A | 10/1998 | Ikegami | |
|---|---|---|---|---|
| 5,956,338 | A | 9/1999 | Ghaibeh | |
| 6,493,335 | B1 * | 12/2002 | Darcie et al. | 370/344 |
| 6,934,340 | B1 * | 8/2005 | Dollard | 375/260 |
| 7,440,399 | B2 * | 10/2008 | Julian et al. | 370/230 |
| 7,545,732 | B2 * | 6/2009 | Oh et al. | 370/206 |
| 7,697,624 | B2 * | 4/2010 | Orihashi et al. | 375/267 |

(Continued)

FOREIGN PATENT DOCUMENTS

| EP | 1175032 A1 | 1/2002 |
|---|---|---|
| WO | WO02053719 A2 | 7/2002 |

(Continued)

OTHER PUBLICATIONS

International Search Report for PCT/IB2005/051970.

(Continued)

*Primary Examiner* — Erin File

(57) ABSTRACT

A fast method for allocating those channels or subcarriers of a multicarrier network to an ahead lying transmission is to let a transmitting terminal and a receiving terminal which intend to access the medium determine the status of the channels or subcarriers that are within their reception range and send a signal indicating the determined status to the corresponding terminal which will select those channels or subcarriers for the eventual transmission which fit best. Other terminals within the transmission range of the transmitting or the receiving terminal respect the reservation and wait for the current transmission to find out which channels or subcarriers are actually used.

23 Claims, 9 Drawing Sheets

U.S. PATENT DOCUMENTS

| | | | |
|---|---|---|---|
| 2001/0024427 A1* | 9/2001 | Suzuki | 370/329 |
| 2003/0063592 A1 | 4/2003 | Seki | |
| 2004/0127223 A1* | 7/2004 | Li et al. | 455/446 |
| 2005/0107045 A1* | 5/2005 | Kroeger | 455/83 |
| 2005/0180515 A1* | 8/2005 | Orihashi et al. | 375/260 |
| 2006/0126749 A1* | 6/2006 | Armour et al. | 375/260 |
| 2006/0133273 A1* | 6/2006 | Julian et al. | 370/230 |
| 2006/0136790 A1* | 6/2006 | Julian et al. | 714/704 |
| 2007/0002958 A1* | 1/2007 | Chang et al. | 375/260 |
| 2007/0041311 A1* | 2/2007 | Baum et al. | 370/208 |
| 2007/0058693 A1* | 3/2007 | Aytur et al. | 375/130 |
| 2007/0140102 A1* | 6/2007 | Oh et al. | 370/208 |
| 2007/0147253 A1* | 6/2007 | Sutivong et al. | 370/236 |
| 2008/0075109 A1* | 3/2008 | Zangi | 370/458 |
| 2008/0101211 A1* | 5/2008 | Rao | 370/206 |
| 2009/0028107 A1* | 1/2009 | Julian et al. | 370/329 |
| 2009/0034456 A1* | 2/2009 | Peng et al. | 370/329 |

FOREIGN PATENT DOCUMENTS

WO     WO02069665 A2     9/2002

OTHER PUBLICATIONS

Written Opinion for PCT/IB2005/051970.

* cited by examiner s6: 11111100,00111111,11111111
s6 (fix) : fixed channel allocation
s7: 11111100,11111001,11110000
s8: 00000001,00011111,11100111

▨ p-th packet of the connection
▨ (p+1)-th packet of the connection
▨ (p+2)-th packet of the connection

METHOD FOR SIGNALING THE STATUS OF A SUBCARRIER IN A MC NETWORK AND A METHOD FOR ADAPTIVELY ALLOCATING THE SUBCARRIERS IN A MC NETWORK

TECHNICAL FIELD

The invention relates to a method of signalling the status of subcarriers which are used in a Multi Carrier (MC) system, where several subcarriers are used for parallel transmission of data packets. One currently used MC mechanism is applied to a CDMA (Code Division Multiple Access) network. In a CDMA network each data symbol is spread over a larger bandwidth, larger than the bandwidth needed for transmission. Like this the spectral energy that is required is lower than in a non spread spectrum system, a fact that can be used to allow parallel transmission channels, at the same time in the same frequency band. The data transmitted in the different channels can be distinguished by the use of a different spreading code for each channel. The data stream consists of a successive sequence of symbols or chips. Each symbol of the data stream of one user is multiplied by each element of the same spreading code and is thus placed in several narrow band subcarriers.

In the following, the word channels includes code channels which consist of certain determined channels.

The invention especially relates to the Wireless LAN (Local Area Network) standard of the IEEE (Institute of Electrical and Electronics Engineers) 802.11 system that uses CSMA/CA (Carrier Sense Multiple Access with Collision Avoidance) as its Media Access Control (MAC) protocol. In CSMA a node verifies the absence of other traffic before transmitting on a shared physical medium. The physical medium may be a band of electromagnetic spectrum in a radio network such as the Wireless LAN or an electrical bus on an optical fiber or twisted cable in the Ethernet. In a radio network several connections can occur at the same time. Therefore, before attempting to send, a transmitter listens on the carriers in order to detect the presence of an (encoded) signal from another station.

The invention further relates to a device that is able to access a multicarrier network working with a certain bandwidth which is divided into several channels or subcarriers. It relates as well to a system for allocating certain channels or subcarriers to an ahead lying transmission.

The invention also relates to a method for adaptively allocating to a connection those channels or subcarriers in a Multi Carrier network that are currently idle or that currently seem to fit best.

BACKGROUND

On a medium with Multiple Access, multiple nodes may concurrently send and receive. The concurrent transmission by multiple nodes may result in frame collisions, in which a receiver is unable to extract frames from overlapping received signals.

The device attempting to transmit may have a certain working bandwidth which is different from the intended receiver's working bandwidth. The overlapping area of those two bandwidths forms the common bandwidth that may be used in the current MC system.

Two different multiple access mechanisms are the CSMA/CA (Carrier Sense Multiple Access with Collision Avoidance) and the CSMA/CD (Carrier Sense Multiple Access with Collision Detection). In the mechanism Collision Avoidance a data station that intends to transmit firstly sends a reservation signal, secondly after waiting a sufficient time for all stations to receive the reservation signal transmits a frame and thirdly while transmitting, if the station detects a reservation signal from another station, it stops transmitting for a random time and then reattempts. Whereas in the mechanism Collision Detection a station that detects another signal while transmitting a frame stops transmitting the frame, transmits a collision indicating signal and then waits for a random time interval before reattempting to send that frame.

In a radio network a large area can be covered if the subsets, for example clusters, in which the network is divided, are interconnected by forwarders or bridges, for example. Subscribers of two neighbouring clusters cannot directly communicate when one subscriber is not in the reception range of the other. Signals sent by a forwarder can be received by members of both neighbouring clusters. One mechanism used to minimize the hidden node problem is the on demand mechanism Request-to-Send/Clear-to-Send (RTS/CTS) of the Ethernet. Before the transmission of a data frame starts the sending station sends an RTS frame which is answered by a CTS frame of the receiving station. The RTS and the CTS frame contain information about the length of the transmission duration of the subsequent data frame and about the corresponding ACK frame (Acknowledgement). By using the RTS/CTS mechanism it is achieved that a third station as a hidden node that is too far away from the sending station to receive the RTS frame, but sufficiently close to the receiving station to receive the CTS frame will not start a transmission on its own as it realizes the observed channel as not being idle.

Between two frames in the sequence RTS, CTS, DATA and ACK a Short Interframe Space (SIFS) could be arranged which is of 16 µs duration in the case of the protocol 802.11a.

The MC-CDMA mechanism is a digital modulation technique that spreads each data symbol of the data stream in the frequency domain as shown in FIG. 1 concerning the prior art. A copy of each original symbol or chip is placed in each of the narrow band subcarriers. The total channel bandwidth is divided into subcarriers, in this example into four subcarriers f1 to f4. Assuming that the symbol duration is $T_b$, the spectral distance of the subcarriers should be at least $1/T_b$.

In the example of FIG. 1 the original signals of the 4 users are spread into 4 subcarriers, each fed with one copy of the original signal (chip) thus giving a Spreading Gain of 4. In order to differentiate between the various chips on one channel or subcarrier each chip is encoded as the used spreading code defines it. Data belonging to the same channel or subcarrier are all spread with the same binary code sequence of length L.

For example when using a frequency-shift keying a "0" in the third place of the binary code sequence means that a factor $\pi$ will be added to the phase of third chip that will be put to the $3^{rd}$ subcarrier and a "1" in the third place of the binary code sequence corresponds to a phase shift of 0 as regards the phase of the chip.

That symbol or that signal that is finally transmitted on the $n^{th}$ subcarrier corresponds to the sum of each of the $n^{th}$ chips of k parallel channels, with k=4 in this example. The variable k corresponds to the amount of active users, subscribers, terminals or stations respectively.

As different devices have different subsets of available subcarriers in which they can operate, two devices intending to initiate a connection have to find a common set of subcarriers or channels respectively on which they are going to exchange information.

Each channel uses a centre frequency of the bandwidth area that is variable. For example a channel that needs for its operation a certain number (e.g. 8) of subcarriers has to choose the subcarriers out of a group of subcarriers which are the common or overlapping subcarriers of transmitter's available subcarriers and the receiver's available subcarriers.

One object of the invention is to provide a method for signalling the status of a subcarrier in a Multi Carrier network.

A further object of the invention is to provide a method for adaptively allocating to a connection certain subcarriers of those subcarriers in a Multi Carrier network that are currently idle.

SUMMARY

Another object of the invention is to provide a device that is able to access a multicarrier network working with a certain bandwidth which is divided into several channels or subcarriers with the device being able to support the allocation of certain channels or subcarriers to an ahead lying transmission.

It is also an object of the invention to provide a system which allocates certain channels or subcarriers to an ahead lying transmission.

With regard to the signalling method the object is solved by a method for signalling the status of a subcarrier in a medium such as a Multi Carrier network working with a certain bandwidth which is divided into a certain amount of channels or subcarriers wherein for signalling the status a terminal sends a status signal indicating the current status of each channel or subcarrier of the bandwidth. Within a network, connections are set up, kept on and later on finished. During one connection that is kept on some of the medium's channels may be used and thus occupied. Once that connection is finished those channels are idle again. That is why the status of the channels varies in time and has to be checked before another connection is set-up. Signalling the status of the medium's channels updates every node listening as regards the current traffic.

The status signal may be transmitted on the medium alternatively
- as a dedicated packet,
- as part of or following a signalling packet (RTS, CTS, ACK) or
- as part of or following a data packet (DATA)

According to one alternative, the dedicated packet is sent alone possibly accompanied by an IFS. According to another alternative the status signal or information respectively is part of a signalling packet as it is transmitted as a field or an information element inside the signalling packet. According to a further alternative it follows a signalling packet without pause or dead time and thus both of them form a combined packet with the status signal being virtually arranged piggyback to the signalling packet. According to yet another alternative, the status signal or information respectively is transmitted as a field or as an information element in the header or any other part of the packet According to a further alternative the status signal is part of or follows a data packet without pause or dead time and thus both of them form a combined packet with the status signal being virtually arranged piggyback to the data packet.

According to one embodiment the status signal is a binary sequence with "1" indicating an idle, i.e. a valid, channel or subcarrier and "0" indicating an occupied, i.e. an invalid, channel or subcarrier. The binary sequence's most significant bit corresponds to the lowest frequency of the chosen bandwidth.

According to a preferred embodiment the length of the binary sequence in bits equals the total amount of channels or subcarriers in the medium as then in one single step the status of the whole medium is communicated.

The proposal signal sent by the transmitting terminal indicates which subcarriers are available from its point of view, i.e. are available in its surrounding or within its radius. The transmitting terminal determines the status of each channel or subcarrier from its point of view. The receiving terminal which probably has a different position and sensing radius and thus a different point of view predetermines the status of the channels or subcarriers and sends a determination signal indicating which subcarriers might be selected taking into account that the receiving terminal is aware of different conditions to those the transmitting station is aware of. The transmitting terminal finally allocates to the ahead lying data transmission subcarriers based on the information of the determination signal. This method is especially useful for a network such as the Ethernet.

The proposal signal may be transmitted on the medium alternatively
- as a dedicated packet,
- as part of or following a signalling packet (RTS) or
- as part of or following a data packet (DATA)

According to one alternative, the dedicated packet is sent alone possibly accompanied by an IFS. According to another alternative the status signal or information respectively is part of a signalling packet as it is transmitted as a field or an information element inside the signalling packet. According to a further alternative it follows a signalling packet without pause or dead time and thus both of them form a combined packet with the status signal being virtually arranged piggyback to the signalling packet. According to yet another alternative, the status signal or information respectively is transmitted as a field or as an information element in the header or any other part of the packet According to a further alternative the status signal is part of or follows a data packet without pause or dead time and thus both of them form a combined packet with the status signal being virtually arranged piggyback to the data packet.

The determination signal may be transmitted on the medium alternatively
- as a dedicated packet or
- as part of or following a signalling packet (CTS, ACK)

Concerning the explanation of the two alternatives it is referred to the above explanation of the proposal signal.

According to one embodiment the proposal signal and the determination signal are binary sequences with "0" indicating an idle, i.e. a valid, channel or subcarrier and "1" indicating an occupied, i.e. an invalid, channel or subcarrier or vice versa according to the settings of the system. The most significant bit corresponds to the lowest frequency.

According to a preferred embodiment the length of the binary sequences in bits equals the total amount of channels or subcarriers in the medium as then in one single step the proposal and in one single step the determination of the whole medium's bandwidth can be communicated.

According to an alternative, in a method for allocating certain channels or subcarriers of a network, the transmitting terminal sends a first management frame indicating a fixed channel or subcarrier allocation and the receiving terminal sends a second Management Frame. Both these Management Frames are taken as basis for the allocation of channels or subcarriers for the ahead lying data transmission. During the duration of the connection the situation in the medium might change as other connections may be finished or a further connection may be initiated. Therefore, during a connection that is kept it might be advantageous or necessary to change the subcarriers that are used. That is why this method is called adaptive allocation as during a connection the subcarriers used might change.

According to one embodiment the first and the second Management Frames are a binary sequences with "1" indicating an idle, i.e. a valid, channel or subcarrier and "0" indicating an occupied, i.e. an invalid, channel or subcarrier. The most significant bit corresponds to the lowest frequency.

According to a preferred embodiment the length of the binary sequences in bits equals the total amount of channels or subcarriers in the medium as in this case in one single step the first Management Frame and in one further single step the second Management Frame can be communicated according to the bandwidth of the whole medium.

According to an alternative, in a method for adaptively allocating certain channels or subcarriers of a network, the transmitting terminal sends a first availability signal on those channels or subcarriers that are idle from its point of view, i.e. are available in its surrounding or within its radius. Then the receiving terminal determines the status of the channels or subcarriers and sends a second availability signal on those channels or subcarriers that are idle according to its point of view and the transmitting terminal allocates based on this information subcarriers to one or more ahead lying data transmissions. As the components of the first availability signal are sent in parallel just as the components of the second availability signal this is a fast kind of negotiation.

According to a preferred embodiment the first and the second availability signals are energy tone pulses. As they are transmitted alone, it is advantageous to choose different frequencies for the first and for the second availability signal as thus a third node listening on the medium can estimate whether it is a transmitting terminal's or a receiving terminal's availability signal.

In order to maximize the ratio of terminals in the transmission range of the transmitting terminal which have knowledge of those channels or subcarriers which are going to be used, after finishing the negotiation, the transmitting terminal may send an announcement signal indicating which channels or subcarriers are finally chosen.

In order to further maximize the ratio of terminals which will not disturb the planned transmission, after receiving the announcement signal, the receiving terminal may send a similar announcement signal indicating which channels or subcarriers are finally chosen The inventive methods, devices and system may be used in a telecommunications network or in a Wireless Local Area Network (WLAN) or a Wireless Personal Area Network (WPAN).

SHORT DESCRIPTION OF DRAWINGS

In the following, the invention will be described in further detail with reference to the accompanying drawing, wherein FIG. 1 shows a prior art digital modulation technique known as the MC-CDMA mechanism;

Figure 7:
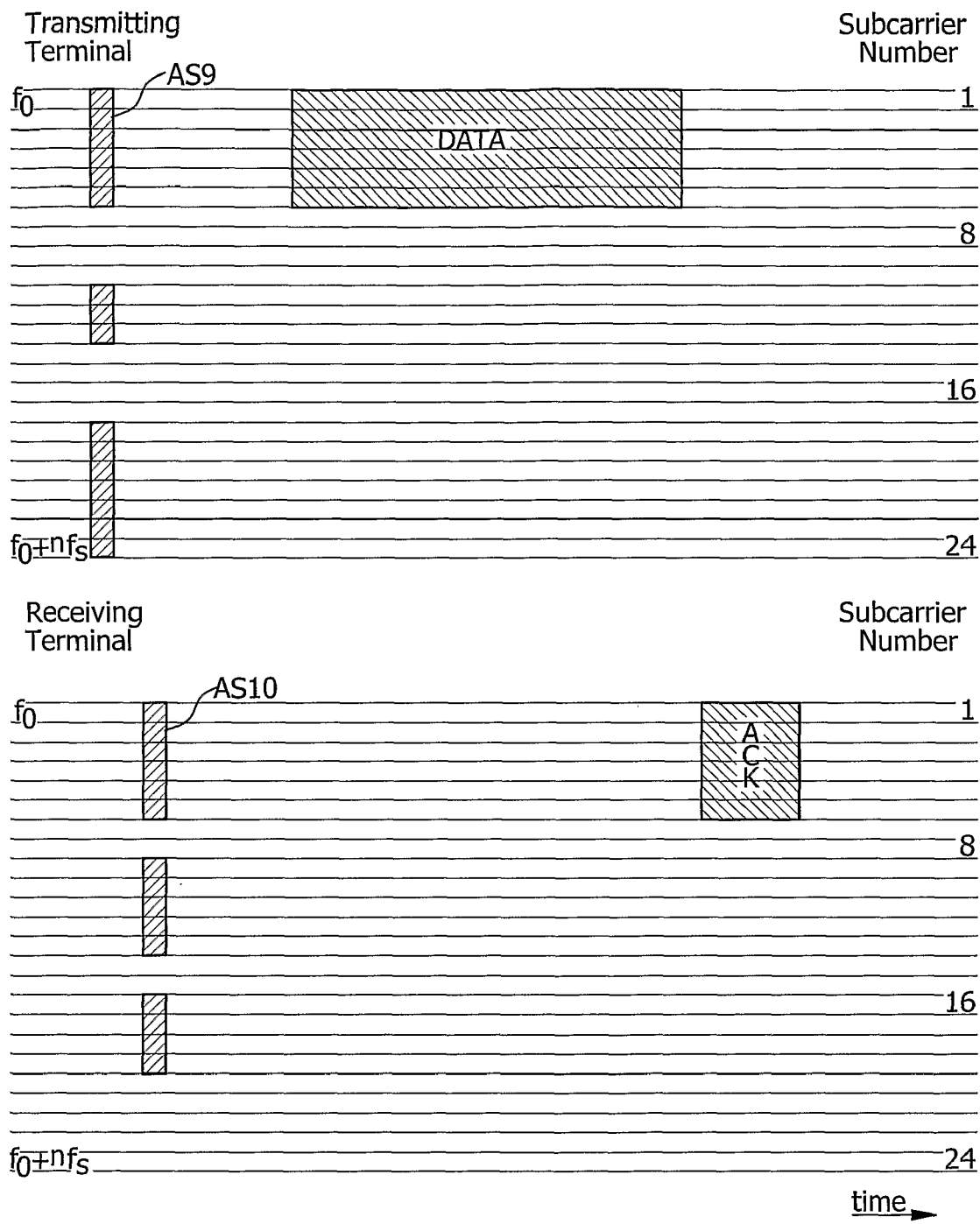
Figure 8:
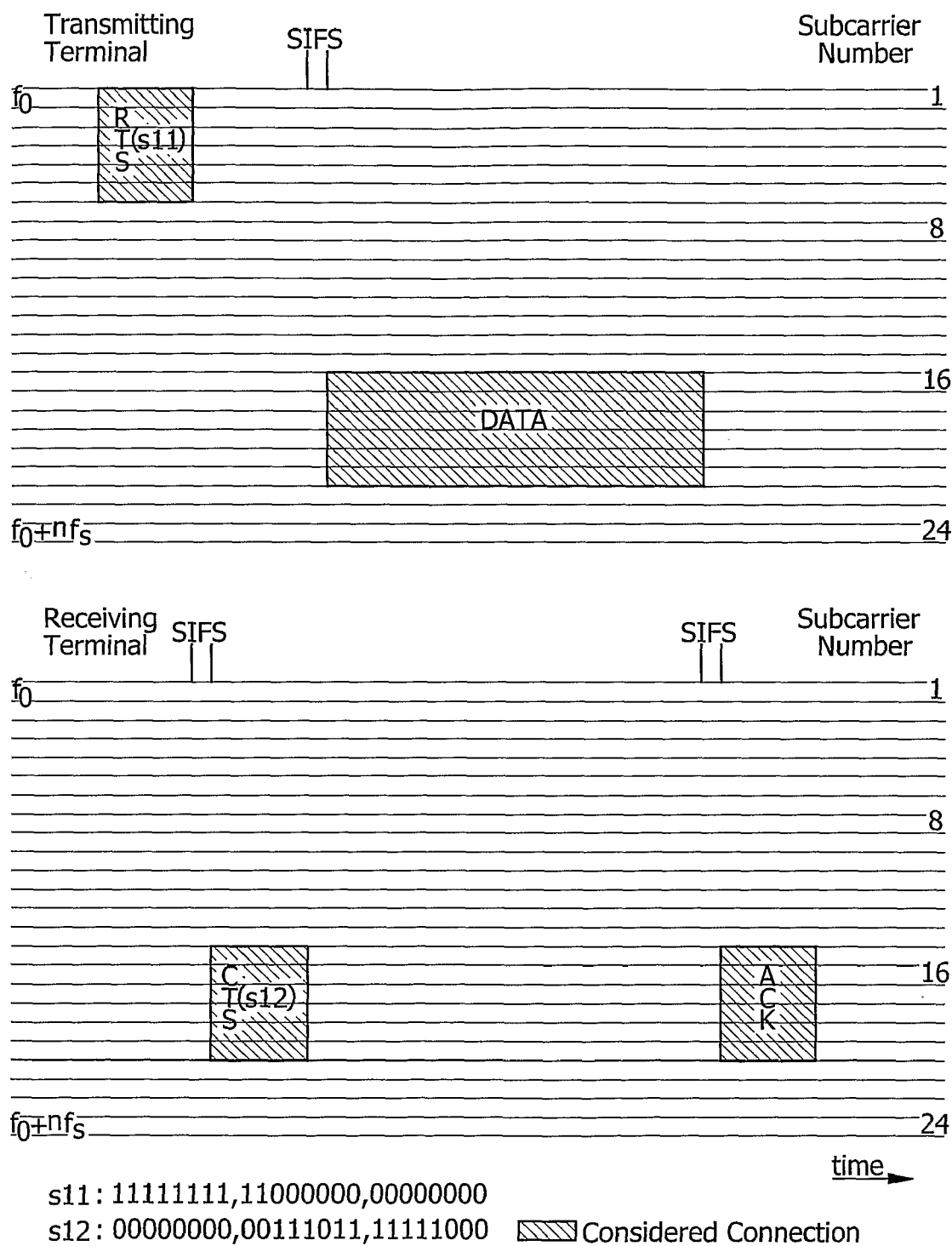

FIG. 7 shows a time diagram for a transmitting terminal as well as for a receiving terminal according to another embodiment of the invention where the Medium Access and the set of subcarriers are negotiated by means of energy pulses and FIG. 8 shows a time diagram for a transmitting terminal as well as for a receiving terminal according to yet another embodiment of the invention where the selected subcarriers are changed after the RTS frame is sent and the newly proposed ones do not belong to the group of subcarriers proposed.

Figure 9:
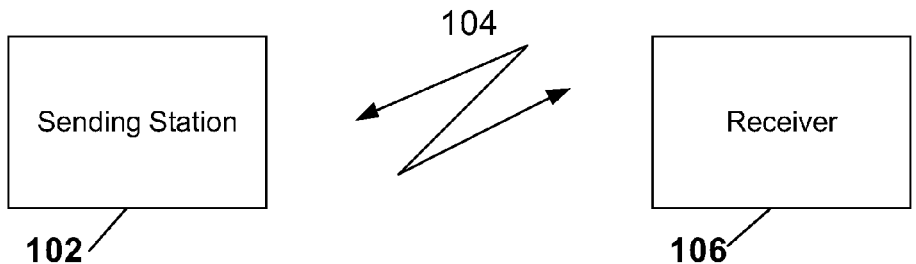
Figure 10:
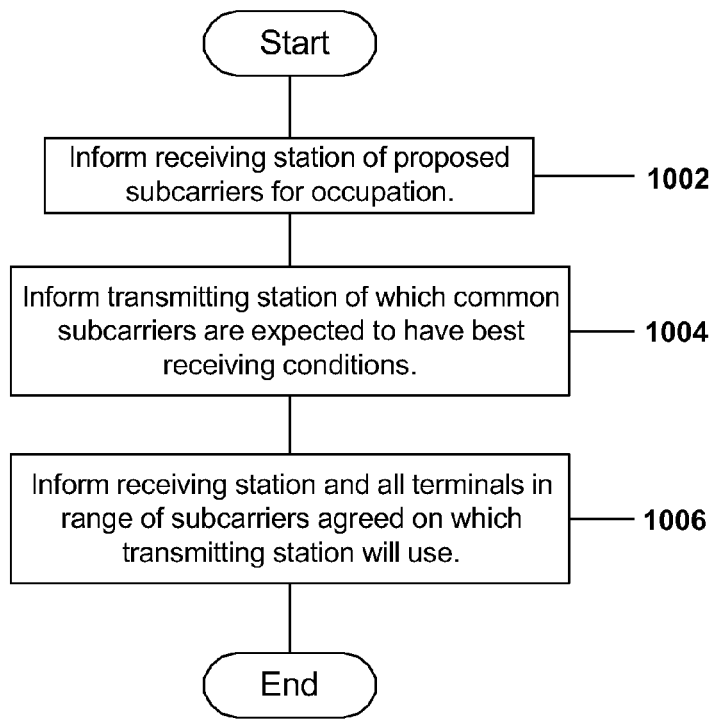

FIG. 9 shows a transmitting station wirelessly communicating with a receiving station;

FIG. 10 shows a method according to an embodiment of the invention.

DETAILED DESCRIPTION

Figure 1:
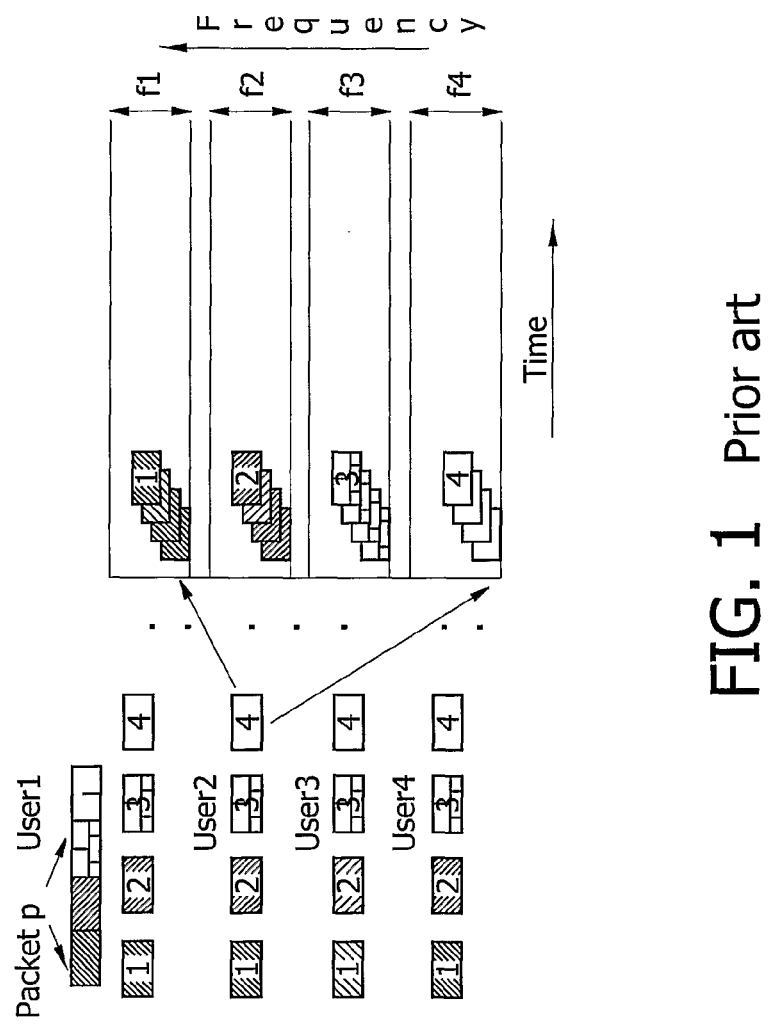
Figure 2:
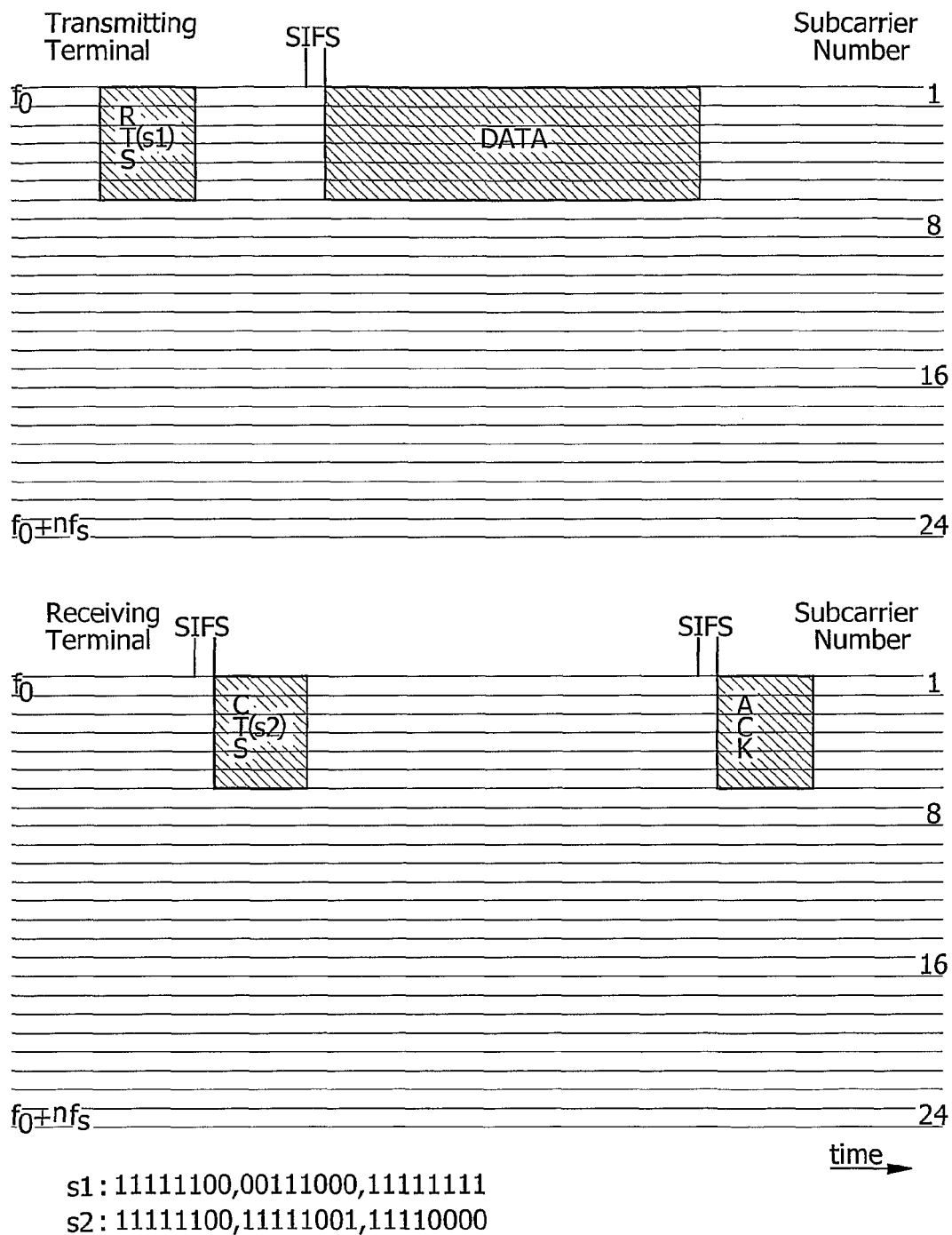
FIG. 2 shows a time diagram for the transmitting terminal as well as for the receiving terminal according to a first alternative.

FIG. 2 shows a time diagram for the transmitting terminal as well as for the receiving terminal according to a first alternative where a proposal signal s1 indicating which subcarriers are available is sent as part of or immediately following a signalling packet (RTS) and after a pause SIFS a determination signal s2 indicating which subcarriers can be selected taking into account the receiving terminal's knowledge of the current traffic is sent as part of or immediately following a signalling packet (CTS). The upper part of the time diagram refers to the transmitting terminal or source and the lower part to the receiving terminal or receiver. A total bandwidth of for example 20 MHz is divided into several channels, for example into 52 subcarriers. Out of those 52 subcarriers 24 are shown. The lowest illustrated subcarrier has the frequency $f_0$. The highest illustrated subcarrier has the frequency $f_\beta + n\, f_s$ with n being the amount of subcarriers, i.e. n=24, and $f_s$ being a step frequency, e.g. the bandwidth of 20 MHz divided by the number of subcarriers n=24 results in $f_s$=0.83 MHz. The signals s1 and s2 are signalling bit sequences of length k corresponding to the number k of the carrier in the system. The description concerning the frequency spectrum of the transmitting terminal is also valid for the receiving terminal.

Figure 3:
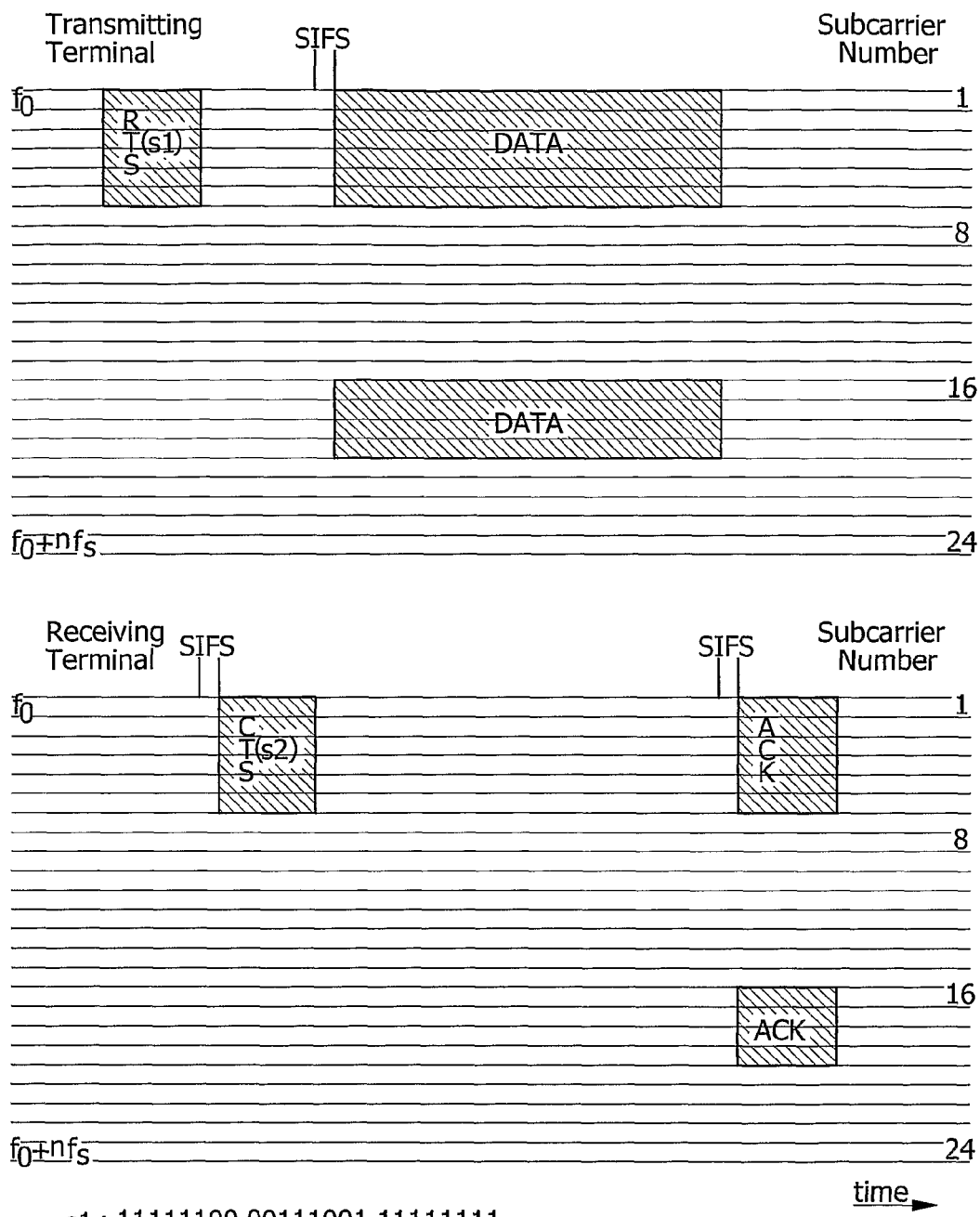
FIG. 3 shows a time diagram for the transmitting terminal as well as for the receiving terminal according to a second alternative.

FIG. 3 shows a time diagram for the transmitting terminal as well as for the receiving terminal according to a second alternative wherein the negotiation between the transmitting terminal and the receiving terminal results in a parallel transmission of data which is performed on subcarriers which are not all adjacent to another. After allocating a set of subcarriers to the planned data transmission the transmitting terminal starts sending on the selected subcarriers and the receiving terminal sends an acknowledgement signal on the group of channels or subcarriers used by the transmitting terminal.

Figure 4:
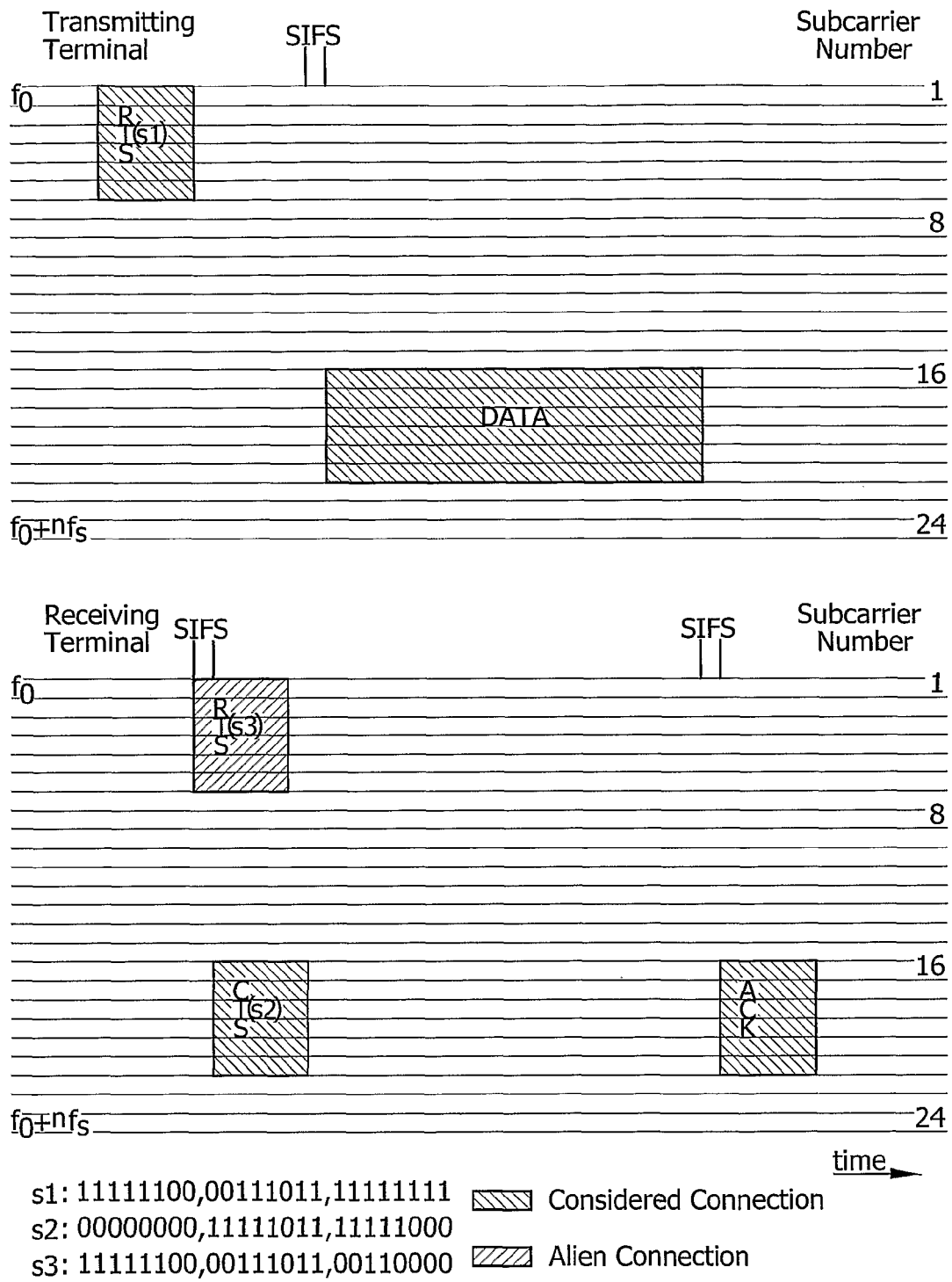
FIG. 4 shows a time diagram for a transmitting terminal as well as for a receiving terminal where the selected subcarriers are changed after the RTS frame is sent.

FIG. 4 shows a time diagram for a transmitting terminal as well as for a receiving terminal where the selected subcarriers are changed after the RTS frame is sent. This means that the transmitting terminal sends its signalling frame on subcarriers it has selected as they are fitting when starting the transmission. During the SIFS the receiving terminal scans the status of the subcarriers and in this example realizes a signalling frame of a third station, i.e. an RTS frame followed by a proposal signal s3. As reaction the receiving terminal answers with a signalling frame CTS followed by a determination signal s2 which is transmitted on different subcarriers from those of the RTS frame. After a SIFS the transmitting terminal sends the data on those subcarriers on which it had received the CTS frame as it allocated those subcarriers to be used for the data transmission. After a further SIFS the receiving terminal sends an acknowledgement frame on the same subcarriers as those used for the data transmission.

The frame comprising signal s3 belongs to an alien connection and interferes.

Figure 5:
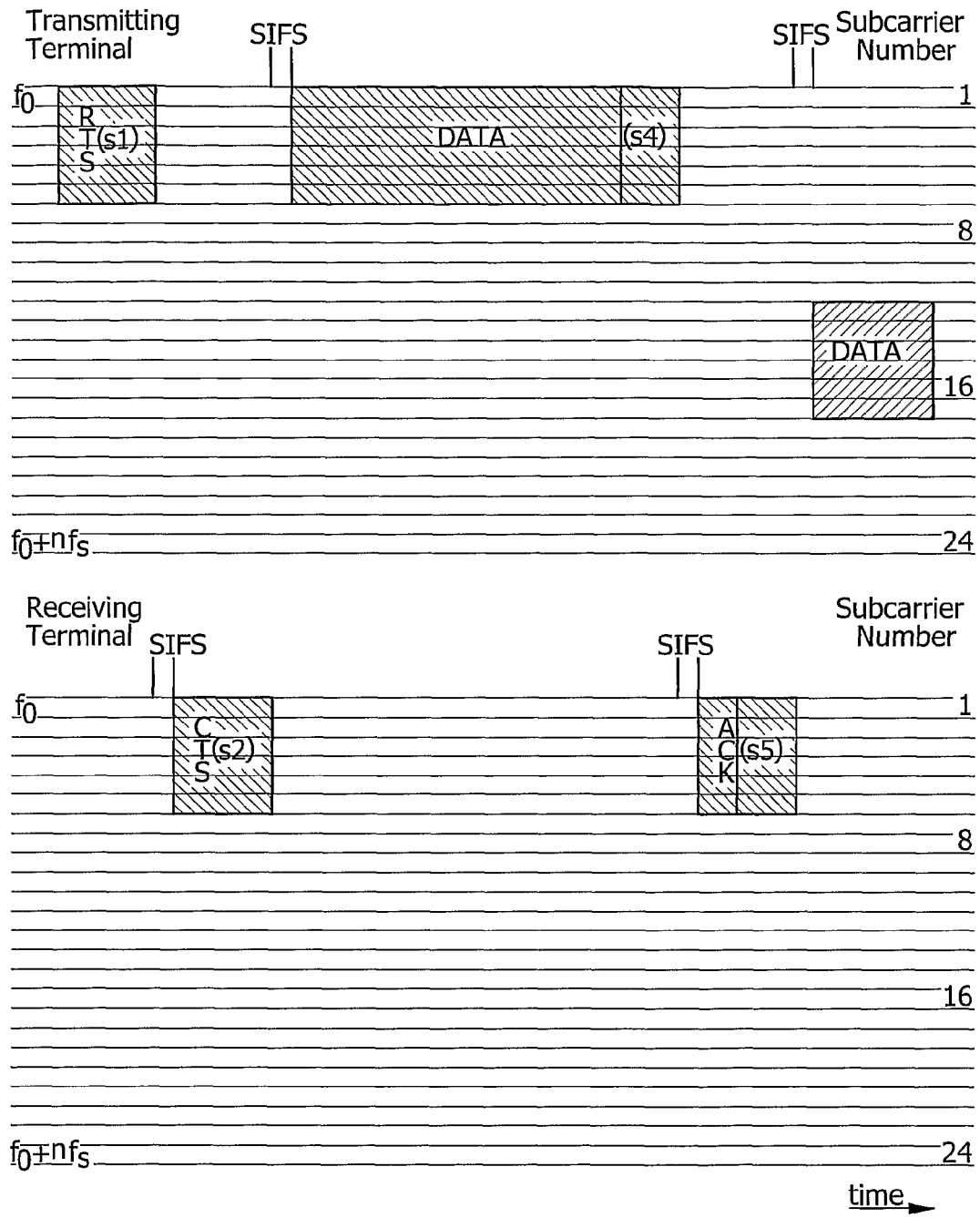
FIG. 5 shows a time diagram for a transmitting terminal as well as for a receiving terminal where the connection is longer than it takes to transmit one data packet.

FIG. 5 shows a time diagram for a transmitting terminal as well as for a receiving terminal where the connection is longer than it takes to transmit one data packet. In this case the proposed set of subcarriers for the following fragment of the data packet is signalled s4 subsequent to the preceding fragment of the data packet and the determined set of subcarriers for the following fragment of the data packet is signalled s5 subsequent to the ACK frame.

Figure 6:
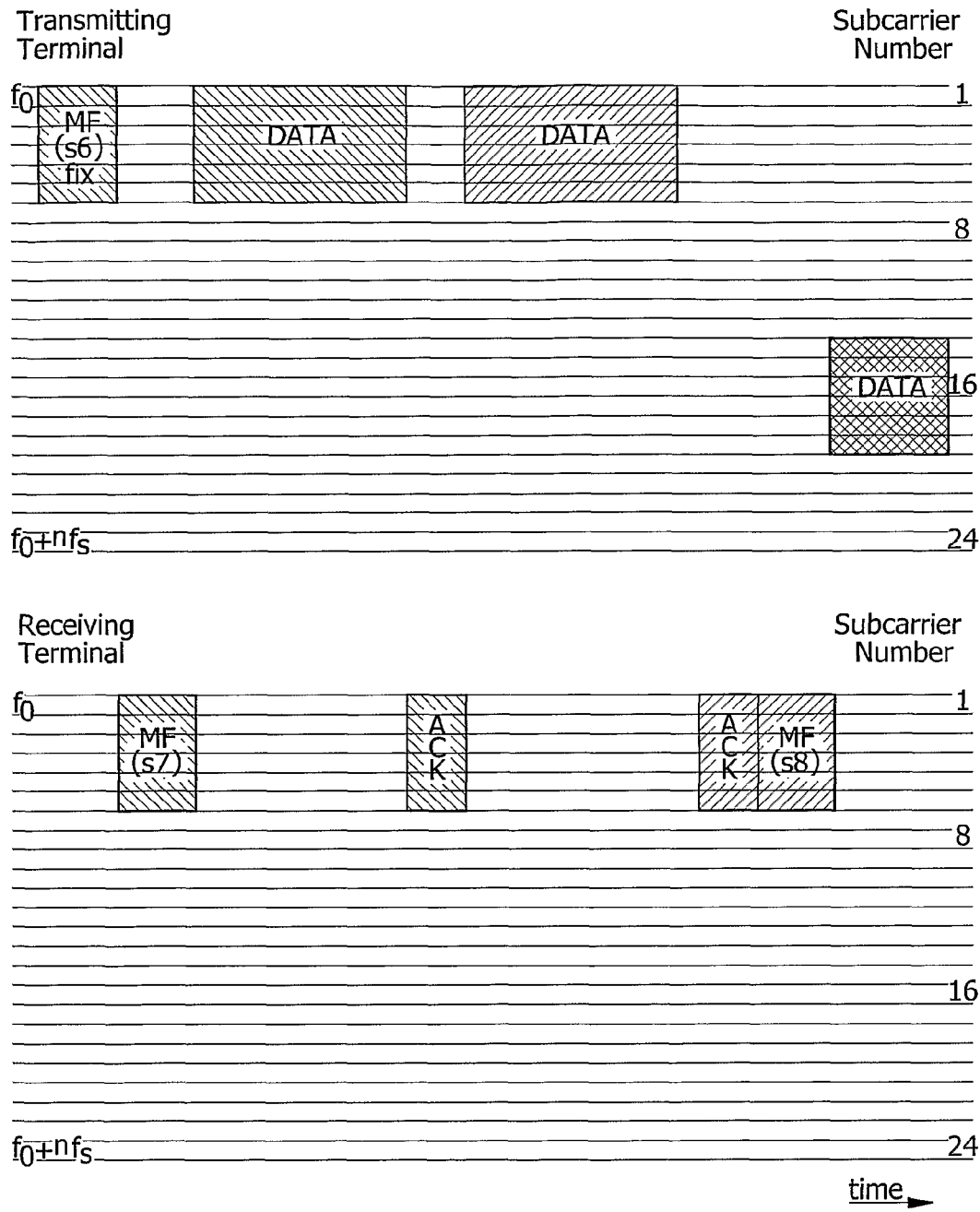
FIG. 6 shows a time diagram for a transmitting terminal as well as for a receiving terminal according to a further embodiment of the invention where the Medium Access is negotiated by means of a Management Frame.

FIG. 6 shows a time diagram for a transmitting terminal as well as for a receiving terminal according to a further embodiment of the invention where the Medium Access is negotiated by means of a Management Frame. The Management Frame sent by the transmitting terminal includes a proposed channel allocation s6 which is answered by the receiving terminal by a Management Frame which contains a destination channel allocation s7. In this example a first and a second data packet are transmitted on those subcarriers which were negotiated in the Management Frame. In this example, the second acknowledgement frame of the receiving terminal is followed by a further Management Frame s8 which contains a binary sequence indicating the current status of the subcarriers. On the basis of this information the transmitting terminal allocates different subcarriers to the transmission of the following data packet(s).

FIG. 7 shows a time diagram for a transmitting terminal as well as for a receiving terminal according to another embodiment of the invention where the Medium Access and the set of subcarriers are negotiated by means of energy pulses. The transmitting terminal that attempts to set up a connection scans the subcarriers and reserves those subcarriers which are currently fitting by sending as first availability signal AS1 an energy tone signal s9 on the concerned subcarriers. The receiving terminal sends a second availability signal AS2 s10 on those subcarriers which can be selected for the forthcoming data transmission. After a pause the transmitting terminal sends a data packet on some or all of those subcarriers it allocated to this transmission according to the AS2 s10 signal of the receiving terminal. The acknowledgement frame of the receiving terminal is sent on the same subcarriers.

FIG. 8 shows a time diagram for a transmitting terminal as well as for a receiving terminal according to another embodiment of the invention where the selected subcarriers are changed after the RTS frame is sent, with ones that were not in the group of the proposed subcarriers. This means that the transmitting terminal sends its signaling frame on subcarriers it has selected as they are fitting when starting the transmission. The receiving terminal scans the status of the subcarriers from his point of view and realizes that the group of convenient subcarriers on its side does not have any overlapping with the ones proposed before. As reaction the receiving terminal answers with a signaling frame CTS followed by a determination signal s12, which is transmitted on different subcarriers from those of the RTS frame. After a SIFS the transmitting terminal sends the data on those subcarriers on which it had received the CTS frame as it allocated those subcarriers to be used for the data transmission. After a further SIFS the receiving terminal sends an acknowledgement frame on the same subcarriers as those used for the data transmission. This case applies when a terminal that sent a proposal s11 for the group of subcarriers that may be used for data exchange does not necessarily expect a reply on those subcarriers.

The invention may be summarized by the following. Referring to FIGS. 9 and 10, the sending station 102 has to inform, at step 1002, the receiving station 106 about a proposed set of channels or subcarriers it wants to occupy. The receiver 106 on the other hand has to signal, at step 1004, to the sending station 102 those channels or subcarriers out of the group of common channels or subcarriers in which the receiving station 106 observes to expect the best receiving conditions. This signalling of the determined set of subcarriers can be performed either at the beginning of a connection on a per packet basis or periodically with a certain period or on demand. Once the sender 102 is aware of the determined set of channels or subcarriers that are going to be used, the sender 102 signals, at step 1006, to the receiver 106 and to all other terminals in the range of a network the set of subcarriers agreed on which it will subsequently use. As the negotiation concerning the resources to be used is done open other members of the network can hear and follow the negotiation. Thus, they are aware of which channels or subcarriers are reserved. Hence, the sender 102 does not necessary have to carry out a further step and signal the chosen set of subcarriers to be used for the data transmission 104. A station that heard an RTS and/or a CTS expects a transmission 104 on each of the carriers that were mentioned as fitting and will not start a transmission on such a carrier. It will first find out those channels or subcarriers that are actually used by listening to the data transmission 104.

One possible reason why a final signaling handshake might be required could be that the other terminals are not listening to the frames, in which the set of subcarriers or channels is proposed by the sender and determined by the receiver. This could e.g. be the case, when the set of subcarriers or channels is signaled in a DATA and ACK frame. Another reason for a final handshake of sender and receiver could be that the receiver could propose one or several subcarriers that were not proposed by the sender. In this case devices around the sender would have had no opportunity to learn about the subcarriers or channels before the DATA transmission starts.

In this invention it is proposed that the receiver chooses a subset of the subcarriers or channels proposed by the sender. However, it is also possible that the receiver chooses completely different subcarriers or channels than the sender. This is possible because it is the receiver, who will finally have to be able to decode the DATA packet.

This sender can announce the subcarrier or channel assignment signaling after the proposal and determination have been carried out either piggyback to a data packet, piggyback to a signalling packet (such as the RTS of IEEE 802.11) or as a special packet dedicated to this purpose.

The $3^{rd}$ and $2^{nd}$ solution are the most recommendable ones, as these additional messages are mainly intended for the other terminals, which have to listen to these messages. Therefore, broadcast messages have to be used.

The receiver acknowledges the received subcarrier assignment with an acknowledgement packet which again can be carried out either piggyback to an own data transmission of the receiver, piggyback to a signalling packet (such as the CTS in IEEE 802.11) or as a separate signalling packet dedicated to this purpose.

Again, the 3$^{rd}$ and 2$^{nd}$ solution are the most recommendable ones.

Finally, it has to be stressed that the process of subcarrier or channel assignment could also be initiated by the receiver of the forthcoming transmission. In this case no negotiation would be required. The receiver would just announce its available subcarriers or channels at the beginning of a connection or from time to time. Terminals wishing to send DATA to this receiver would choose a subset of the subcarriers or channels that are possible for the receiver.

In this latter scenario a final signaling handshake to announce the chosen set of subcarriers or channels to the terminals around the sender and the receiver, as described above, is recommendable.

The invention claimed is:

1. A method for signalling the status of a subcarrier in a Multi Carrier network working with a certain bandwidth, which is divided into a number of subcarriers, comprising:
    signalling the status of each of the subcarriers of the bandwidth,
    wherein, to signal the status, a terminal sends a status signal indicating the current status of each subcarrier of the bandwidth in a sensing radius of the terminal, and
    wherein the status is indicative of whether the subcarrier is occupied, and the status is determined by listening to transmissions by other terminals in the sensing radius of the terminal.

2. The method of claim 1, wherein the status signal is transmitted on the medium as one of a dedicated packet, part of a signalling packet, following the signalling packet, part of a data packet, and following the data packet.

3. The method of claim 1, wherein the status signal is a binary sequence.

4. A method for adaptively allocating subcarriers of a network to a transmitter terminal and a receiver terminal which attempt to exchange data, the method comprising:
    sending a proposal signal indicating which subcarriers are available;
    sending a determination signal indicating which subcarriers can be selected; and
    allocating, based on the information of the determination signal, subcarriers to a forthcoming data transmission,
    wherein a bandwidth of the network is divided into several subcarriers,
    wherein sending the proposal signal and allocating subcarriers is done by the transmitter terminal and is carried out based on available subcarriers among the several subcarriers of the bandwidth in a sensing radius of the transmitter terminal, and wherein the sending the determination signal is done by the receiver terminal and is carried out based on available subcarriers among the several subcarriers of the bandwidth in a sensing radius of the receiving terminal, and the available subcarriers are determined by listening to transmissions by other terminals in the sensing radius of the receiver terminal.

5. The method of claim 4, wherein the proposal signal is transmitted as one of a dedicated packet, part of a signalling packet, following the signalling packet, part of a data packet, and following the data packet.

6. The method of claim 4, wherein the determination signal is transmitted as one of a dedicated packet, part of a signalling packet, and following the signalling packet.

7. The method of claim 4, wherein both the proposal signal and the determination signal are binary sequences.

8. A method for adaptively allocating subcarriers of a network to both a transmitter and a receiver which attempt to exchange data, comprising:
    sending a first Management Frame indicating a fixed subcarrier allocation;
    sending a second Management Frame; and
    allocating, based on the information of the second Management Frame, subcarriers to one or several forthcoming data transmissions,
    wherein a bandwidth of the network is divided into several subcarriers,
    wherein sending the first Management frame and allocating subcarriers is done by the transmitter and is carried out based on available subcarriers among the several subcarriers of the bandwidth in a sensing radius of the transmitter, and
    wherein sending the second Management Frame is done by the receiver and is carried out based on available subcarriers among the several subcarriers of the bandwidth in a sensing radius of the receiver.

9. The method of claim 8, wherein the first and the second Management Frames are binary sequences.

10. A method for adaptively allocating subcarriers of a network to both a transmitter and a receiver which attempt to exchange data, comprising:
    sending a first Availability Signal on the subcarriers that meet the transmitter's requirements from the transmitter's perspective;
    sending a second Availability Signal on the subcarriers that meet the receiver's requirements from the receiver's perspective;
    allocating, based on the information of the first and the second Availability Signal, subcarriers to one or more forthcoming data transmissions,
    wherein a bandwidth of the network is divided into several subcarriers,
    wherein sending the first Availability Signal and allocating subcarriers is done by the transmitter and is carried out based on available subcarriers among the several subcarriers of the bandwidth in a sensing radius of the transmitter, and
    wherein sending the second Availability Signal is done by the receiver and is carried out based on available subcarriers among the several subcarriers of the bandwidth in a sensing radius of the receiver, and the available subcarriers are determined by listening to transmissions by other terminals in the sensing radius of the receiver.

11. The method of claim 10, wherein the first and the second Availability Signals are binary sequences.

12. The method of claim 3, wherein the length of the binary sequence in bits equals the total amount of channels or subcarriers in the medium.

13. The method of claim 10, wherein the first and the second Availability Signals are energy tone pulses.

14. The method of claim 4, wherein, in the allocating step, the subcarriers, which are adaptively allocated according to which subcarriers are available, are one of constantly kept for a certain duration and re-allocated after every data transmission.

15. The method of claim 4, wherein, after finishing a negotiation, the transmitter terminal sends an announcement signal indicating which subcarriers are finally chosen.

16. The method of claim 15, wherein, after receiving the announcement signal, the receiver terminal sends a similar announcement signal indicating which subcarriers are finally chosen.

17. A device for multicarrier network communications, the device is configured to:
    determine the status of subcarriers on a multicarrier network;

generate a status signal, and
send the status signal on the network,
wherein a bandwidth of the multicarrier network is divided into several subcarriers,
wherein the status is indicative of, for each subcarrier of the bandwidth, whether the subcarrier is occupied, and
wherein the status is based on the subcarriers in a sensing radius of the device, and the status is determined by listening to transmissions by other devices in the sensing radius of the device.

18. The device of claim 17, further configured to:
produce a binary sequence in accordance with a predetermined status of the subcarriers of the network.

19. A device for multicarrier network communications, the device is configured to:
determine a status of every subcarrier of a multicarrier network's bandwidth, which is divided into several subcarriers;
generate a proposal signal;
send the proposal signal on the multicarrier network;
receive a determination signal generated and sent by a receiving terminal; and
allocate, based on the determination signal, subcarriers to a forthcoming data transmission,
wherein the status is indicative of whether the subcarrier is occupied, and
wherein the status is based on the subcarriers in a sensing radius of the device, and the status is determined by listening to transmissions by other devices in the sensing radius of the device.

20. A device for multicarrier network communications, the device is configured to:
determine a status of every subcarrier of a multicarrier network's bandwidth, which is divided into several subcarriers;
generate a first Management Frame indicating a fixed subcarrier allocation according to the determined status;
send the first Management Frame on the network; and
receive a second Management Frame generated and transmitted by a further terminal,
wherein the status is indicative of whether the subcarrier is occupied, and
wherein the status is based on the subcarriers in a sensing radius of the device, and the status is determined by listening to transmissions by other devices in the sensing radius of the device.

21. A device for multicarrier network communications, the device is configured to:
determine a status of each subcarrier on a multicarrier network with a bandwidth that is divided into several subcarriers,
send a first Availability Signal in parallel on those subcarriers belonging to the bandwidth;
receive a second Availability Signal transmitted in parallel on those subcarriers that belong to the bandwidth; and
allocate certain subcarriers to a forthcoming transmission,
wherein the status is indicative of whether the subcarrier is occupied, and wherein the status is based on the subcarriers in a sensing radius of the device, and the status is determined by listening to transmissions by other devices in the sensing radius of the device.

22. The device of claim 21, further configured to:
generate an energy tone pulse.

23. A multicarrier network communications system for allocating a certain number of subcarriers to a forthcoming transmission, the system comprising:
a first device configured to:
determine the status of each of the subcarriers of a network's bandwidth in a sensing radius of the first device, which is divided into several subcarriers; and
generate a signal according to the determined status of the subcarriers in the sensing radius of the first device; and
a second device configured to:
determine the status of the subcarriers in a sensing radius of the second device; and
generate a signal according to the status of the subcarriers in the sensing radius of the second device, wherein the status is indicative of whether the subcarrier is occupied, and the status is determined by listening to transmissions by other devices in the sensing radius of the second device.

* * * * *